(12) United States Patent
Liu et al.

(10) Patent No.: US 10,919,775 B2
(45) Date of Patent: Feb. 16, 2021

(54) METHOD FOR PREPARING LITHIUM CARBONATE FROM LITHIUM IRON PHOSPHATE BATTERY SCRAPS AND LITHIUM CARBONATE THEREOF

(71) Applicant: Hunan Jinyuan New Materials Co., Ltd., Yiyang (CN)

(72) Inventors: Xunbing Liu, Yiyang (CN); Jianjun Ouyang, Yiyang (CN); Xijuan Liu, Yiyang (CN)

( * ) Notice: Subject to any disclaimer, the term of this patent is extended or adjusted under 35 U.S.C. 154(b) by 0 days.

(21) Appl. No.: 16/261,877

(22) Filed: Jan. 30, 2019

(65) Prior Publication Data

US 2019/0161357 A1 May 30, 2019

Related U.S. Application Data

(63) Continuation of application No. PCT/CN2017/105873, filed on Oct. 12, 2017.

(30) Foreign Application Priority Data

Aug. 26, 2016 (CN) .......................... 201610729431.0

(51) Int. Cl.
| | |
|---|---|
| *C01D 15/08* | (2006.01) |
| *H01M 10/54* | (2006.01) |
| *C22B 3/44* | (2006.01) |
| *C22B 7/00* | (2006.01) |
| *C22B 26/12* | (2006.01) |

(52) U.S. Cl.
CPC ................ *C01D 15/08* (2013.01); *C22B 3/44* (2013.01); *C22B 7/007* (2013.01); *C22B 26/12* (2013.01); *H01M 10/54* (2013.01); *Y02W 30/84* (2015.05)

(58) Field of Classification Search
None
See application file for complete search history.

(56) References Cited

U.S. PATENT DOCUMENTS

| 2005/0123670 A1 | 6/2005 | Vasquez |
| 2018/0177732 A1 | 6/2018 | Barnscheid et al. |

FOREIGN PATENT DOCUMENTS

| CN | 102956936 A | | 3/2013 |
| CN | 103474719 A | | 12/2013 |
| CN | 104103831 A | * | 10/2014 |
| CN | 104831072 A | | 8/2015 |
| CN | 105119024 A | | 12/2015 |

OTHER PUBLICATIONS

Internation Search Report of PCT/CN2017/105873, dated Jan. 3, 2018.
Wu, Yue et al., Recovery of Aluminium, Iron and Lithium from Spent Lithium Iron Phosphate Batteries, Chinese Journal of Power Sources, Apr. 30, 2014, pp. 629-631.

* cited by examiner

*Primary Examiner* — Melissa S Swain
(74) *Attorney, Agent, or Firm* — Erson IP (Nels On IP)

(57) ABSTRACT

The present disclosure provides a method for preparing lithium carbonate from lithium iron phosphate battery scraps and lithium carbonate thereof, and relates to a method for preparing lithium carbonate from lithium iron phosphate battery scraps and a lithium carbonate product thereof. The method specifically includes the following steps; performing oxidative acidolysis on a lithium iron phosphate material, thickening lithium solution, adding alkali to remove iron, and precipitating lithium carbonate, thereby obtaining a filter cake which is a lithium carbonate product. Lithium may be directly extracted by utilizing the lithium iron phosphate battery scraps. A technical problem in the prior art that lithium iron phosphate battery wastes cannot be effectively decomposed and recycled is solved. The method has the characteristics of simple process, high, lithium yield, and low production cost.

18 Claims, No Drawings

METHOD FOR PREPARING LITHIUM CARBONATE FROM LITHIUM IRON PHOSPHATE BATTERY SCRAPS AND LITHIUM CARBONATE THEREOF

CROSS-REFERENCE TO RELATED APPLICATIONS

This application is a continuation of International Patent Application No. PCT/CN2017/105873 with a filing date of Oct. 12, 2017, designating the United States, now pending, and further claims priority to Chinese Patent Application No. 201610729431.0 with a filing date of Aug. 26, 2016. The content of the aforementioned applications, including any intervening amendments thereto, are incorporated herein by reference.

TECHNICAL FIELD

The present disclosure, relates to a method for preparing lithium carbonate from lithium iron phosphate battery scraps and a lithium carbonate product thereof.

BACKGROUND OF THE PRESENT INVENTION

Due to characteristics of long life, large charge-discharge rate, excellent safety, excellent high-temperature property, element harmlessness and low cost, a lithium iron phosphate battery is a first choice of new energy electric vehicle batteries. With the increasing development of international and domestic new energy automobile industries, demands for the lithium iron phosphate battery will be increased rapidly, and recycling of a waste lithium iron phosphate battery becomes an important problem.

Because lithium, resources in China are quite limited, circular economy of lithium batteries suddenly rises, and a recycling technology of a lithium ion battery a lithium manganate battery, a lithium cobaltate battery and a ternary lithium battery is relatively mature. For example, a method for extracting lithium from lithium-containing waste liquor produced in a waste lithium ion battery recovery process with a patent application number of CN201610120877.3 and a publication number of CN105742744A on a publication date of Jul. 6, 2016 discloses a technology which includes the following steps: (1) taking sodium carbonate as a precipitator, adding the sodium carbonate into the lithium-containing waste liquor to stir and react, and filtering to obtain lithium-precipitated liquor and crude lithium carbonate: and (2) uniformly mixing the crude lithium carbonate obtained in the step (1) and manganese carbonate, and roasting to obtain sodium-containing spinel type lithium manganate. However, a technology for preparing lithium carbonate from lithium iron phosphate battery scraps is not reported yet.

SUMMARY OF PRESENT INVENTION

Since lithium of a waste lithium iron phosphate battery, is low in content and difficult to separate and extract, how to extract the lithium from waste lithium iron phosphate economically and simply has become a technical problem. With respect to an existing technical problem that the waste lithium iron phosphate battery cannot be effectively decomposed and recycled, the purpose of the present disclosure is to disclose a method for directly preparing lithium carbonate by taking the waste lithium iron phosphate battery as a raw material and a lithium carbonate product thereof.

The first technical solution of the present disclosure is a method for preparing lithium carbonate from lithium iron phosphate battery scraps. The method specifically includes the following steps: performing oxidative acidolysis on a lithium iron phosphate material, adding alkali to remove iron, and precipitating lithium carbonate, thereby obtaining a filter cake which is a lithium carbonate product.

The second technical solution of the present disclosure is a method for preparing lithium carbonate from lithium iron phosphate battery scraps. The method specifically includes the following steps: performing oxidative acidolysis on a lithium iron phosphate material, thickening lithium solution, adding alkali to remove iron, and precipitating lithium carbonate, thereby obtaining a filter cake which is a lithium carbonate product.

Further, the lithium iron phosphate material is a powdered material, and is prepared by crushing a waste lithium iron phosphate battery and separating lithium iron phosphate from aluminum paper.

Further, the step of oxidative acidolysis includes: adding a powdered lithium iron phosphate material into acid liquor according, to a certain ratio, adding an oxidizing agent, and filtering to obtain a lithium-containing solution.

Further, the step of thickening the lithium solution includes: adding a lithium-containing solution into acid liquor, adding a lithium iron phosphate material according to a certain ratio, adding an oxidizing agent, filtering the lithium-containing solution, and repeating for many times to increase a lithium concentration in the solution.

Further, the step of adding alkali to remove iron includes: adding an alkaline substance into the lithium-containing solution, separating and precipitating an iron ion in the lithium-containing solution, and filtering to obtain iron-free lithium solution.

Further, the step of precipitating lithium carbonate includes: heating the iron-free lithium solution, adding a certain amount of carbonate solution, and filtering to obtain, a filter cake which, is a lithium carbonate product.

Further, in the step of oxidative acidolysis:

The acid liquor is one or more of sulfuric acid, hydrochloric acid and nitric acid.

Further, a concentration of the acid liquor is 0.5-8 N, preferably 1-7.5 N. 1.5-7 N, 2.0-6.5 N, 2.5-6 N, 3.0-5.5 N, 3.5-5.0 N and 4.0-4.5 N in sequence, and may be 0.5-4 N, 1-3.5 N, 1.5-3 N and 2-2.5 N.

The certain ratio is a liquid-solid mass ratio of (3-5):1, and preferably 4:1.

The addition is slow addition.

The oxidizing agent is added in accordance with 0.1-1.2 times of the mass of the lithium iron phosphate, preferably 0.2-1.1 times, 0.3-1.0 time, 0.4-0.9 time, 0.5-0.8 time and 0.6-0.7 time.

The oxidizing agent is one or more of hydrogen peroxide, sodium nitrate, sodium nitrite, sodium chlorate and sodium hypochlorite.

After the oxidizing agent is added, stirring is performed at a constant temperature for 10-90 minutes, preferably 15-85 minutes, 20-80 minutes, 25-75 minutes, 30-70 minutes, 35-65 minutes, 40-60 minutes, 45-55 minutes and 50 minutes in sequence.

Further, in the step of thickening the lithium solution:

The added acid is one or more of sulfuric acid, hydrochloric acid and nitric acid. The acidity is 0.5-8N, preferably 1-7.5 N, 1.5-7 N, 2.0-6.5 N, 2.5-6 N, 3.0-5.5 N, 3.5-5.0 N and 4.0-4.5 N in sequence.

The lithium iron phosphate material is added under a stirring condition according to a liquid-solid ratio of (3-5):1, preferably 4:1.

Further, the step of repeating for many times may be realized according to the oxidative acidolysis step for 2-8 times, preferably 3-7 times, 4-6 times and 5 times.

Further, the step of increasing the lithium concentration in the solution is to enable lithium content in the lithium-containing solution to reach 10-80 g/L.

Further, in the step of adding alkali to remove iron:

The alkaline substance is one or more of sodium hydroxide, potassium hydroxide and ammonium hydroxide.

The alkaline substance is added to regulate a pH value of the lithium solution to 2-13. The pH value is preferably 3-12, 4-11, 5-10, 6-9 and 7-8 in sequence.

Further, in the step of precipitating lithium carbonate:

The step of heating the iron-free lithium solution is to heat to a temperature a 60-100° C., preferably 65-95° C., 70-90° C., 75-85° C. and 80° C.

The carbonate solution is one or a mixture of more of a sodium carbonate solution, a potassium carbonate solution and an ammonium carbonate solution.

The certain amount is an amount of 8-12 times of the mass of the lithium, preferably 9-11 times and 10 times.

The addition speed of the carbonate solution is 0.2-1.5 $m^3/h$, preferably 0.3-1.4 $m^3/h$, 0.4-1.3 $m^3/h$, 0.5-1.2 $m^3/h$, 0.6-1.1 $m^3/h$, 0.7-1.0 $m^3/h$, 0.8-0.9 $m^3/h$ and 0.7 $m^3/h$.

The lithium carbonate product may be prepared by drying the filter cake.

The carbonate solution is prepared by heating and dissolving carbonate according to a mass fraction of 10-25%, preferably 15-20%, and maintaining the temperature to 60-100° C., preferably 70-90° C. and 80° C.

Because the above technical solutions are adopted in the present disclosure, lithium may be directly extracted by utilizing the lithium iron phosphate battery scraps and a technical problem in the prior art that waste lithium iron phosphate batteries cannot be effectively decomposed and recycled is solved. The method has characteristics of simple process, high lithium yield and low production cost.

BEST IMPLEMENTATION OF PRESENT INVENTION

Embodiment 3: a method for preparing lithium carbonate from lithium iron phosphate battery scraps is performed according to the following steps:

a, material, preparation: waste lithium iron phosphate was crushed by fully closed crushing and gravity separation equipment, and lithium iron phosphate attached to aluminum paper was separated from the aluminum paper to prepare a lithium iron phosphate powdered material;

b, oxidative acidolysis: the lithium iron phosphate powdered material prepared in the step a was slowly added into a prepared hydrochloric acid solution of 4 N according to a liquid-solid mass ratio of 4:1, the solution was heated and stirred, a temperature was controlled to 80° C., sodium hypochlorite was added according to an amount of 0.6 time of the mass of the lithium iron phosphate, stirring was performed at a constant temperature, a reaction was carried out for 45 minutes, operations of filtering and washing were performed, a filter cake was subjected to harmless treatment, and the filtrate and washing liquor were merged into a lithium-containing solution to enter a next process;

c, lithium solution thickening: the lithium-containing solution was added into concentrated hydrochloric acid to enable the acidity to be 4 N, stirring was started, and the waste lithium iron phosphate powdered material was added according to a liquid-solid mass ratio of 4:1; and the operation was repeated for 5 times according to the oxidative acidolysis step below, so that lithium content in the lithium-containing solution reaches at least 30 g/L;

d, addition of alkali to, remove iron: a pH value of the lithium solution was regulated to 6 with sodium hydroxide, operations of filtering and washing were performed, a filter cake was subjected to harmless treatment, and the filtrate and washing liquor were merged into iron-free lithium solution to enter a next process; and e, precipitation of lithium carbonate: sodium carbonate was heated and dissolved in, a sodium carbonate dissolving barrel according to a mass fraction of 15%, and the temperature was maintained at 90° C.; the iron-free lithium solution was heated to 90° C. in a lithium precipitating barrel, and a solution in an amount of pure sodium carbonate was slowly added according to an amount of 10 times of the mass of the lithium-containing solution, wherein the addition speed was 1 $m^3/h$; stirring was performed at a constant temperature for 2 hours; operations of filtering and washing were performed, and the filtrate and washing liquor were merged for dissolving the sodium carbonate; and the filter cake was dried, thereby obtaining the lithium carbonate product.

PREFERRED EMBODIMENT OF THE DISCLOSURE

Embodiment 1: a method for preparing lithium carbonate from lithium iron phosphate battery scraps includes the following steps: oxidative acidolysis was performed on a lithium iron phosphate material, alkali was added to remove iron, and lithium carbonate was precipitated, thereby obtaining a filter cake which is a lithium carbonate product.

Embodiment 2: a method for preparing lithium carbonate from lithium iron phosphate battery scraps includes the following steps: oxidative acidolysis was performed on a lithium iron phosphate material, lithium solution was, thickened, alkali was added to remove iron, and lithium carbonate was precipitated, thereby obtaining a filter cake which is a lithium carbonate product.

Embodiment 3: a method for preparing lithium carbonate from lithium iron phosphate battery scraps includes the following steps:

a, material preparation: a waste lithium iron phosphate battery was crushed, and lithium iron phosphate was, separated from aluminum paper to obtain a lithium iron phosphate powdered material;

b, oxidative acidolysis: the lithium iron phosphate powdered, material prepared in the step a was added into acid liquor according to a certain ratio, an oxidizing agent was added, and filtration was performed to obtain a lithium-containing solution;

c, addition of alkali to remove iron: an alkaline substance was added into the lithium-containing solution, an iron ion in the lithium iron phosphate was separated and precipitated, and filtration was performed to obtain iron-free lithium solution; and d, precipitation of lithium carbonate: the iron-free lithium solution was heated, a certain amount of carbonate solution was added, and filtration was performed to obtain a filter cake which is a lithium carbonate product.

Embodiment 4: according to a method for preparing lithium carbonate from lithium iron phosphate battery scraps illustrated in Embodiment 3, a step of thickening lithium solution is added between the step of oxidative acidolysis and the step of adding alkali to remove iron: acid liquor was added into a lithium-containing solution under a stirring condition, a lithium iron phosphate material was added according to a certain ratio, an oxidizing agent was added, the lithium-containing solution was filtered, and the operation was, repeated for, many times so as to, increase a lithium concentration in the solution. Other steps are the same as those in Embodiment 3.

Embodiment 5: a method for preparing lithium carbonate from lithium iron phosphate battery, scraps is performed according to the following steps:

a, material preparation: a waste lithium iron phosphate battery was crushed, and lithium iron phosphate attached to aluminum paper was separated from the aluminum paper to prepare a lithium iron phosphate powdered material;

b, oxidative acidolysis: the lithium iron phosphate powdered material prepared in the step a was slowly added into a prepared sulfuric acid or hydrochloric acid or nitric acid or mixed acid solution of 0.5-8 N according to a liquid-solid mass ratio of (3-5):1, the solution was heated and stirred, a temperature was controlled to 60-100° C., sodium nitrate or sodium nitrite or sodium chlorate or sodium hypochlorite or a mixture thereof was added according to an amount of 0.1-1.2 times of the mass of the lithium iron phosphate, stirring was performed at a constant temperature, a reaction was carried out for 10-90 minutes, operations of filtering and washing were performed, and the filtrate and washing liquor were merged into a lithium-containing solution to enter a next process;

c, addition of alkali to remove iron: a pH value of the lithium solution was regulated to 2-13 with one or more of sodium hydroxide or potassium hydroxide or ammonium hydroxide and other alkaline substances, operations of filtering and washing were performed, and the filtrate and washing liquor were merged into iron-free lithium solution, to enter a next process; and d, precipitation of lithium carbonate: sodium carbonate was heated and dissolved in, a sodium carbonate dissolving barrel according to a mass fraction of 10-25%, and the temperature was maintained at 60-100° C.

The iron-free lithium solution, was heated to 60-100° C. in a lithium precipitating barrel, and a pure sodium carbonate solution was slowly added according to an amount of 8-12 times of the lithium content, wherein the addition speed is 0.5-1.5 m$^3$/h; stirring was performed at a constant temperature for 0.5-3 hours; operations of filtering and washing were performed, and the filtrate and washing liquor were merged for dissolving the sodium carbonate, thereby obtaining filter cake which is a lithium carbonate product.

Embodiment 1: a method for preparing lithium carbonate from lithium iron, phosphate battery scraps is performed according to the following steps:

a, material preparation: a waste lithium iron phosphate battery was crushed, and lithium, iron phosphate attached to aluminum paper was separated from the aluminum paper to prepare a lithium iron phosphate powdered material;

b, oxidative acidolysis: the lithium iron phosphate powdered material prepared in the step a was, slowly added into a prepared hydrochloric acid solution of 0.5 N according to a liquid-solid mass ratio of 3:1, the solution was heated and stirred, a temperature was controlled to 60° C., sodium nitrate was added according to an amount of 0.1 time of the mass of the lithium iron phosphate, stirring was performed at a constant temperature, a reaction was carried out for 90 minutes, operations of filtering and washing were performed, and the filtrate and washing liquor were, merged into a lithium-containing solution to enter a next process;

c, addition of alkali to remove iron: a pH value of the lithium solution was regulated to 2 with sodium hydroxide, operations of filtering and washing were performed, and the filtrate and washing liquor were merged into iron-free lithium solution to enter a next process; and d, precipitation of lithium carbonate: sodium carbonate was heated and dissolved in a sodium carbonate dissolving barrel according to a mass fraction of 10%, and the temperature was maintained at 60° C.

The iron-free lithium solution was heated to 60° C. in a lithium precipitating barrel, and a pure sodium carbonate solution was slowly added according to an amount of 8 times of the lithium content, wherein the addition speed was 0.5 m$^3$/h; stirring was performed at a constant temperature for 3 hours; operations of filtering and washing were performed, and the filtrate and washing liquor were merged for dissolving the sodium carbonate, thereby obtaining a filter cake which is a lithium carbonate product.

Embodiment 2: a method for preparing lithium carbonate from lithium iron phosphate battery scraps is performed according to the following steps:

a, material, preparation: waste lithium iron phosphate was crushed by fully closed crushing and gravity separation equipment, and lithium iron phosphate attached to aluminum paper was separated from the aluminum paper to prepare a lithium iron phosphate powdered material;

b, oxidative acidolysis: the lithium, iron phosphate powdered material prepared in the step a was slowly added into a prepared sulfuric acid solution of 2 N according to a liquid-solid mass ratio of 5:1, the solution was heated and stirred, a temperature was controlled to 100° C., sodium hypochlorite was, added according to an amount of 0.2 time of the mass of the lithium iron phosphate, stirring was performed at a constant temperature, a reaction was carried out for 30 minutes, operations of filtering and washing were performed; a filter cake was subjected to harmless treatment; and the filtrate and washing liquor were merged into a lithium-containing solution to enter a next process;

c, lithium solution thickening: the lithium-containing solution was added into concentrated sulfuric acid to enable the acidity to be 0.5 N, stirring was started, and the waste lithium iron phosphate powdered material was added according to a liquid-solid mass ratio of 3:1 was added; and the operation was repeated twice according to the oxidative acidolysis step below, so that lithium content in the lithium-containing solution reaches at, least 20 g/L;

d, addition of alkali to remove iron: a pH value of the lithium solution was regulated to 13 with sodium hydroxide, operations, of filtering and washing were performed, a filter cake was subjected to harmless treatment, and the filtrate and washing liquor were merged into iron-free lithium solution to enter a next process; and e, precipitation of lithium carbonate: sodium carbonate was heated and dissolved in a sodium carbonate dissolving barrel according to a mass fraction of 25%, and the temperature was maintained at 100° C.; the iron-free lithium solution was heated to 100° C. in a lithium precipitating barrel, and a solution in an amount of pure sodium carbonate was slowly added according to an amount of 12 times of the mass of the lithium-containing solution, wherein the addition speed was 1.5 m$^3$/h; stirring was performed at a constant temperature for 0.5 hour; operations of filtering and washing were performed, and the filtrate and washing liquor were merged for dissolving the sodium carbonate; and the filter cake was dried, thereby obtaining the lithium carbonate product.

Embodiment 3: a method for preparing lithium carbonate from lithium iron phosphate battery scraps is performed according to the following steps:

a, material preparation: waste lithium iron phosphate was crushed by fully closed crushing and gravity separation equipment, and lithium iron phosphate attached to aluminum paper was separated from the aluminum paper to prepare a lithium iron phosphate powdered material;

b, oxidative acidolysis: the lithium iron phosphate powdered material prepared in the step a was slowly added into a prepared hydrochloric acid solution of 4 N according to a liquid-solid mass ratio of 4:1, the solution was heated and stirred, a temperature was controlled to 80° C., sodium hypochlorite was added according to an amount of 0.6 time of the mass of the lithium iron phosphate, stirring was performed at a constant temperature, a reaction was carried out for 45 minutes, operations of filtering and washing were performed, a filter cake was subjected to harmless treatment, and the filtrate and washing liquor were merged into a lithium-containing solution to enter a next process;

c, lithium solution thickening: the lithium-containing solution was added into concentrated hydrochloric acid to enable the acidity to be 4 N, stirring was started, and the waste lithium iron phosphate powdered material was added according to a liquid-solid mass ratio of 4:1; and the operation was repeated for 5 times according to the oxidative acidolysis step below, so that lithium content in the lithium-containing solution reaches at least 30 g/L;

d, addition of alkali to, remove iron: a pH value of the lithium solution was regulated to 6 with sodium hydroxide, operations of filtering and washing were performed, a filter cake was subjected to harmless treatment, and the filtrate and washing liquor were merged into iron-free lithium solution to enter a next process; and e, precipitation of lithium carbonate: sodium carbonate was heated and dissolved in, a sodium carbonate dissolving barrel according to a mass fraction of 15%, and the temperature was maintained at 90° C.; the iron-free lithium solution was heated to 90° C. in a lithium precipitating barrel, and a solution in an amount of pure sodium carbonate was slowly added according to an amount of 10 times of the mass of the lithium-containing solution, wherein the addition speed was 1 m$^3$/h; stirring was performed at a constant temperature for 2 hours; operations of filtering and washing were performed, and the filtrate and washing liquor were merged for dissolving the sodium carbonate; and the filter cake was dried, thereby obtaining the lithium carbonate product.

Embodiment 4: a method for preparing lithium carbonate from lithium iron, phosphate battery scraps is performed according to the following steps:

a, material preparation: waste lithium iron phosphate was crushed by fully closed crushing and gravity separation equipment, and lithium iron phosphate attached to aluminum paper was separated from the aluminum paper to prepare a lithium iron phosphate powdered material;

b, oxidative acidolysis: 15 m$^3$ of washing water or clean water was added into a 20 m$^3$ of reaction barrel in advance; stirring was started, and 1.0 m$^3$ of concentrated sulfuric acid was slowly added; 5 t of the lithium iron phosphate powdered material prepared in the step a were added into the reaction barrel at a speed of 2 t per hour, a temperature was controlled to 100° C., and 650 kg of sodium chlorate solids were added at a speed of 1 t per hour; stirring was performed at a constant temperature, and a reaction was carried out for 60 minutes; operations of filtering and washing were performed, the filter cake was subjected to harmless treatment, and the filtrate and washing liquor were merged into a lithium-containing solution to enter a next process;

c, lithium solution thickening: 15 m$^3$ of the lithium-containing solution was pumped into a 20 m$^3$ of reaction barrel, stirring was started, 1.0 m$^3$ of concentrated sulfuric acid was added, and the operation was repeated for 4 times according to the oxidative acidolysis step, so that the lithium content in the lithium-containing solution reaches 18-25 g/L; the effects of the lithium solution thickening are as follows: because lithium carbonate is slightly soluble to water, in the processes of precipitating and washing lithium carbonate, the lithium content in mother liquor and washing liquor is about 2 g/L. In order to increase one-time yield, a lithium-precipitated stock solution may be preferably a lithium saturated solution in the system, so the lithium solution needs to be thickened;

d, addition of alkali to remove iron: a pH value of the lithium solution was regulated to 7 with sodium hydroxide, operations of filtering and washing were performed, a filter cake was subjected to harmless treatment, and the filtrate and washing liquor were merged into iron-free lithium solution to enter a next process. A principle is a ferric ion hydrolysis reaction, and a pH value during hydrolysis is 2.5-13, and a reaction formula is $Fe^{+3}+3(OH)-=Fe(OH)_3\downarrow$; and e, precipitation of lithium carbonate: 1.1 t of sodium carbonate was heated and dissolved into 5 m$^3$ of water in a 8 m$^3$ of sodium carbonate dissolving barrel, and the temperature was maintained at 100° C.; 5 m$^3$ of a lithium-containing solution was pumped into a 10 m$^3$ of lithium precipitating barrel and heated to 100° C., and 3 m$^3$ of solution in an amount of thermal sodium carbonate was added at a speed of 1 m$^3$ per hour; stirring was performed at a constant temperature for 1.0 hours; operations of filtering and washing were performed by using a centrifugal machine, and the filtrate and washing liquor were merged for dissolving the sodium carbonate; and the filter cake was dried, thereby obtaining the lithium carbonate product.

In order to save space, embodiments of the present disclosure are not limited to above examples. Each technical key point within and beyond a parameter scope of the technical solution of the present disclosure, and technical features reasoned, expanded and rearranged by those skilled in the art according to the technical solution of the present disclosure shall belong to the scope illustrated in the embodiments of the present disclosure.

INDUSTRIAL APPLICABILITY

After a pilot test in the present disclosure, related indicators of detection and yield are shown in the following table:

| | Chemical composition | | | | | | | | | |
|---|---|---|---|---|---|---|---|---|---|---|
| Item | Li | Ca | Fe | Cu | Mn | Mg | Ni | Na | Pb | Cr |
| Raw material % | 4.02 | | 34.22 | | | | | | | |
| Leaching liquor (cycling for 4 times) g/L | 20.58 | | | | | | | | | |

-continued

| Item | Chemical composition | | | | | | | | | |
|---|---|---|---|---|---|---|---|---|---|---|
| | Li | Ca | Fe | Cu | Mn | Mg | Ni | Na | Pb | Cr |
| Leaching residue | 0.05 | | | | | | | | | |
| Iron-free solution | 20.44 | 0.0017 | 0.0027 | 0.0008 | 0.0005 | 0.0009 | 0.0048 | 21.11 | 0.0001 | 0.0001 |
| Tapping slag % | 0.12 | | 42.15 | | | | | | | |
| Lithium precipitation mother liquor g/L | 2.04 | | | | | | | | | |
| Lithium carbonate washing liquor g/L | 1.87 | | | | | | | | | |
| Lithium carbonate product % | 17.47 | 0.050 | 0.003 | 0.0003 | 0.0009 | 0.016 | 0.0038 | 0.039 | 0.0001 | 0.0001 |
| Li yield | Leaching 98.75% | | Tapping 99.31% | | Lithium precipitating 85.03 | | Wasting 92.07 | | Total yield 90.57% | |

Notes: the lithium precipitation mother liquor and the lithium carbonate washing liquor are returned to the system; the recovery is 92.35%, and total recovery is: 98.75%*99.31%*92.35%=90.57%.

We claim:

1. A method for preparing lithium carbonate from lithium iron phosphate battery scraps, comprising: performing oxidative acidolysis on a lithium iron phosphate material, improving concentration of lithium in a lithium-containing solution output from the step of performing oxidative acidolysis, adding alkali to remove iron, and precipitating lithium carbonate, thereby obtaining a filter cake which is a lithium carbonate product, wherein the step of improving concentration of lithium in the lithium-containing solution comprises:
adding a first acid liquor into the lithium-containing solution repeatedly until the concentration of lithium reaches a desired value, wherein the first acid liquor is a concentrated acid liquor, and times to repeat the step of improving concentration of lithium in the lithium-containing solution include at least 2-6 times.

2. The method for preparing lithium carbonate from lithium iron phosphate battery scraps according to claim 1, wherein the step of performing oxidative acidolysis comprises: adding the lithium iron phosphate material into a second acid liquor, adding an oxidizing agent, and filtering to obtain the lithium-containing solution.

3. The method for preparing lithium carbonate from lithium iron phosphate battery scraps according to claim 2 wherein a ratio to add the lithium iron phosphate material into the second acid liquor includes: (3-5):1.

4. The method for preparing lithium carbonate from lithium iron phosphate battery scraps according to claim 2, wherein after adding the oxidizing agent, the method further comprising:
heating output from the step of adding the oxidizing agent in a temperature under stirring, the temperature is controlled to 65-95° C. and time is controlled to 20-80 minutes.

5. The method for preparing lithium carbonate from lithium iron phosphate battery scraps according to claim 2, wherein in the step of adding the oxidizing agent, the oxidizing agent is added in accordance with 0.1-1.2 times of the mass of the lithium iron phosphate material and is, stirred at a constant temperature for 10-90 minutes.

6. The method for preparing lithium carbonate from lithium iron phosphate battery scraps according to claim 5, wherein the oxidizing agent is, one or more of hydrogen peroxide, sodium nitrate, sodium nitrite, sodium chlorate and sodium hypochlorite.

7. The method for preparing lithium carbonate from lithium iron phosphate battery scraps according to claim 2, wherein the second acid liquor is one or more of sulfuric acid, hydrochloric acid and nitric acid; and a concentration of the acid liquor is 0.5-8 N.

8. The method for preparing lithium carbonate from lithium iron phosphate battery scraps according to claim 1, wherein the step of adding alkali to remove iron, and precipitating lithium carbonate comprises: adding an alkaline substance into the improved lithium-containing solution.

9. The method for preparing lithium carbonate from lithium iron phosphate battery scraps according to claim 8, wherein the added alkaline substance is one or more of sodium hydroxide, potassium hydroxide and ammonium hydroxide; and the alkaline substance is added to regulate a pH value of the improved lithium-containing solution to 2-13.

10. The method for preparing lithium carbonate from lithium iron phosphate battery scraps according to claim 8, wherein the step of precipitating lithium carbonate further comprises: heating the iron-free lithium solution, adding a certain amount of carbonate solution, and filtering to obtain the filter cake which is the lithium carbonate product, wherein the iron-free lithium solution is heated to 60-100° C.

11. The method for preparing lithium carbonate from lithium iron phosphate battery scraps according to claim 10, wherein in the step of adding the certain amount of carbonate solution, sodium carbonate solution is added according to an amount of 8-12 times of the mass of the lithium in the iron-free lithium solution.

12. The method for preparing lithium carbonate from lithium iron phosphate battery scraps according to claim 10, wherein after the certain amount of carbonate solution is added, stirring is performed at a constant temperature for 0.5-3 hours.

13. The method for preparing lithium carbonate from lithium iron phosphate battery scraps according to claim 10, wherein the carbonate solution is prepared by heating and dissolving carbonate according to a mass fraction of 10-25%, and maintaining the temperature to 60-100° C. and the carbonate solution is one or a mixture of more of a sodium carbonate solution, a potassium carbonate solution and an ammonium carbonate solution.

14. The method for preparing lithium carbonate from lithium iron phosphate battery scraps according to claim 1, wherein the method further comprising:

drying the filter cake to obtain the lithium carbonate product.

15. The method for preparing lithium carbonate from lithium iron phosphate battery scraps according to claim 1, wherein the lithium iron phosphate material is a powdered material.

16. The method for preparing lithium carbonate from lithium iron phosphate battery scraps according to claim 1, wherein the desired value includes 10-40 g/L.

17. The method for preparing lithium carbonate from lithium iron phosphate battery scraps according to claim 1, wherein the concentrated acid liquor includes at least one of concentrated hydrochloric acid and concentrated sulfuric acid.

18. The method for preparing lithium carbonate from lithium iron phosphate battery scraps according to claim 1, wherein the step of improving concentration of lithium in the lithium-containing solution is performed under stirring.

* * * * *